United States Patent
Petruska et al.

(10) Patent No.: US 10,335,763 B2
(45) Date of Patent: Jul. 2, 2019

(54) MICROPOROUS CARBON MONOLITHS FROM NATURAL CARBOHYDRATES

(71) Applicant: Entegris, Inc., Billerica, MA (US)

(72) Inventors: Melissa A. Petruska, Newtown, CT (US); Edward A. Sturm, New Milford, CT (US); Shaun M. Wilson, Trumbull, CT (US)

(73) Assignee: Entegris, Inc., Billerica, MA (US)

( * ) Notice: Subject to any disclaimer, the term of this patent is extended or adjusted under 35 U.S.C. 154(b) by 210 days.

(21) Appl. No.: 15/506,158

(22) PCT Filed: Aug. 22, 2015

(86) PCT No.: PCT/US2015/046435
§ 371 (c)(1),
(2) Date: Feb. 23, 2017

(87) PCT Pub. No.: WO2016/032915
PCT Pub. Date: Mar. 3, 2016

(65) Prior Publication Data
US 2018/0221851 A1  Aug. 9, 2018

Related U.S. Application Data

(60) Provisional application No. 62/041,057, filed on Aug. 23, 2014.

(51) Int. Cl.
| | |
|---|---|
| *B01J 20/20* | (2006.01) |
| *B01J 20/28* | (2006.01) |
| *B01J 20/30* | (2006.01) |
| *C01B 32/318* | (2017.01) |
| *B01D 53/02* | (2006.01) |
| *F17C 11/00* | (2006.01) |
| *C01B 32/05* | (2017.01) |
| *C01B 32/324* | (2017.01) |
| *C01B 32/366* | (2017.01) |
| *H01G 11/24* | (2013.01) |
| *H01G 11/34* | (2013.01) |

(52) U.S. Cl.
CPC ............. *B01J 20/20* (2013.01); *B01D 53/02* (2013.01); *B01J 20/2808* (2013.01); *B01J 20/28011* (2013.01); *B01J 20/28016* (2013.01); *B01J 20/28042* (2013.01); *B01J 20/28057* (2013.01); *B01J 20/28064* (2013.01); *B01J 20/28092* (2013.01); *B01J 20/3078* (2013.01); *B01J 20/3085* (2013.01); *C01B 32/05* (2017.08); *C01B 32/318* (2017.08); *C01B 32/324* (2017.08); *C01B 32/366* (2017.08); *F17C 11/002* (2013.01); *F17C 11/005* (2013.01); *F17C 11/007* (2013.01); *B01D 2253/102* (2013.01); *B01D 2253/342* (2013.01); *B01J 2220/485* (2013.01); *B01J 2220/4825* (2013.01); *B01J 2220/4831* (2013.01); *B01J 2220/4837* (2013.01); *B01J 2220/4875* (2013.01); *C01P 2006/10* (2013.01); *C01P 2006/12* (2013.01); *F17C 11/00* (2013.01); *F17C 2270/0168* (2013.01); *F17C 2270/0518* (2013.01); *H01G 11/24* (2013.01); *H01G 11/34* (2013.01); *Y02C 10/08* (2013.01)

(58) Field of Classification Search
CPC .................. B01J 20/20; B01J 20/28011; B01J 20/28016; B01J 20/28042; B01J 20/28057; B01J 20/28064; B01J 20/2808; C01B 32/318; F17C 11/002
USPC ........................................................ 502/416
See application file for complete search history.

(56) References Cited

U.S. PATENT DOCUMENTS

| | | | |
|---|---|---|---|
| 6,225,257 B1 | 5/2001 | Putyera et al. | |
| 6,309,446 B1 | 10/2001 | Nakanoya et al. | |
| 2002/0103081 A1 | 8/2002 | Wolff | |
| 2005/0188846 A1 | 9/2005 | Carruthers | |
| 2005/0207962 A1 | 9/2005 | Dietz et al. | |
| 2013/0298769 A1 | 11/2013 | Petruska et al. | |

FOREIGN PATENT DOCUMENTS

| | | |
|---|---|---|
| CN | 1303732 A | 7/2001 |
| CN | 102302925 A | 1/2012 |
| WO | 2007/114849 A2 | 10/2007 |
| WO | 2016/032915 A1 | 3/2016 |

OTHER PUBLICATIONS

Mestre, A.S., et al., "High performance microspherical activated carbons for methane storage and landfill gas or biogas upgrade," The Royal Society of Chemistry 2014, published Aug. 1, 2014, pp. 1-8.

(Continued)

*Primary Examiner* — Edward M Johnson
(74) *Attorney, Agent, or Firm* — Entegris, Inc.

(57) ABSTRACT

A carbon pyrolyzate material is disclosed, having utility as an adsorbent as well as for energy storage and other applications. The pyrolyzate material comprises microporous carbon derived from low cost naturally-occurring carbohydrate source material such as polysaccharides. In adsorbent applications, the carbon pyrolyzate may for example be produced in a particulate form or a monolithic form, having high density and high pore volume to maximize gas storage and delivery, with the pore size distribution of the carbon pyrolyzate adsorbent being tunable via activation conditions to optimize storage capacity and delivery for specific gases of interest.

11 Claims, 11 Drawing Sheets

(56) References Cited

OTHER PUBLICATIONS

Policicchio, A., et al., "Higher methane storage at low pressure and room temperature in new easily scalable large-scale production activated carbon for static and vehicular applications," www.elsevier.com/locate/fuel, Published Jul. 27, 2012, pp. 813-821.

Srenscek-Nazzal, J., et al., "Production, characterization and methane storage potential of KOH-activated carbon from sugarcane molasses," Industrial Crops and Products, www.elsevier.com/locate/indcorp, pp. 153-159 (Mar. 2013).

MICROPOROUS CARBON MONOLITHS FROM NATURAL CARBOHYDRATES

CROSS-REFERENCE TO RELATED APPLICATION

The benefit of priority under 35 USC 119 of U.S. Provisional Patent Application 62/041,057 filed Aug. 23, 2014 for "HIGH VOLUMETRIC GAS STORAGE CAPACITY MICROPOROUS CARBON MONOLITHS FROM NATURAL CARBOHYDRATES" is hereby claimed. The disclosure of U.S. Provisional Patent Application 62/041,057 is hereby incorporated herein by reference, in its entirety, for all purposes.

FIELD OF THE DISCLOSURE

The present disclosure generally relates to carbon pyrolyzate materials, and more specifically relates to carbon adsorbents, such as high purity microporous carbon adsorbents, prepared from renewable natural sources, to methods of making such carbon adsorbents, and to systems and processes utilizing such carbon pyrolyzate materials. Such systems and processes may include fluid storage and dispensing systems and processes, e.g., for natural gas for natural gas-powered vehicles, or for supplying process gases for manufacture of semiconductor products, flat-panel displays, solar panels, and the like, or for adsorbent-based heating and refrigeration systems and processes, or for usage in systems and processes involving electrochemical cells, gas capture, gas sequestration, gas separation, and the like.

DESCRIPTION OF RELATED ART

The packaging, storage, transport, and use of many high pressure gases is complicated by potential risks of flammability, toxicity, pyrophoricity, and explosiveness in addition to the inherent physical or asphyxiation hazards.

In order to address these risks and associated hazards, various approaches have been employed to enhance the safety of specialty gas packages in which hazardous gases are stored, and from which such gases are supplied under dispensing conditions for use of the gas.

One such approach involves the provision of a gas storage and dispensing vessel holding a physical adsorbent on which the gas is reversibly adsorbed, with the gas being stored on the adsorbent at low, e.g., sub-atmospheric pressure. Such low pressure storage of gas minimizes the possibility of release or exposure during transportation and handling of the vessel, and has proven to be a very safe and reliable technology for the industry. Vessels of such type have been widely commercialized in the semiconductor manufacturing industry, e.g., for containment of hydride, halide, and organometallic gases for ion implantation, under the trademark SDS® (ATMI/Entegris, Inc., Billerica, Mass., USA). The SDS 3® line of such products utilizes as the physical adsorbent a high density, high capacity, monolithic microporous carbon adsorbent derived from controlled pyrolysis and activation of high purity synthetic polymers such as PVDF (polyvinylidene fluoride), PVDC (polyvinylidene chloride), PMA (polymethyl acrylate), and copolymers of these materials. These specialized carbon adsorbent materials, commercially available under the trademark BrightBlack® (ATMI/Entegris, Inc., Billerica, Mass., USA) feature porosity that accommodates reversible physical adsorption of gases of interest with low energy cost.

The United States and other countries are increasingly utilizing natural gas (methane from natural sources) for domestic fuel needs as new drilling technologies and other extraction techniques such as hydraulic fracturing (fracking) are developed and commercially deployed. As a result of the emerging abundance of affordable natural gas, there are increasing efforts to utilize natural gas as a transportation fuel in light duty engines, small vehicles, lawnmowers, forklifts, and heavy duty trucks. In fact, most manufacturers of Class 8 vehicles (Volvo, Mack, Freightliner, etc.) already commercialize trucks with compressed natural gas (CNG) fuel systems. Over the next decade, the transportation use of natural gas is expected to grow by over 20%.

In general, compressed natural gas systems tend to add significant costs to the vehicles in which they are deployed. This is because tanks and related compression equipment are inherently expensive to build and they are expensive to operate at the high pressure conditions, involving pressures on the order of 25 mPa (over 3600 psi) and higher. Such high-pressure natural gas poses significant potential risks at filling stations as well as on roads and highways.

It therefore would be a significant advance in the art to provide an adsorbent material that is economically manufactured, and able to provide a high capacity, high efficiency natural gas storage medium on which natural gas is sorptively retained in inventory, and from which natural gas can be readily desorbed under dispensing conditions in a safe and efficient manner. The provision of such an adsorbent would greatly advance current efforts to utilize natural gas as a commodity fuel for vehicular as well as other applications.

Similar considerations relate to adsorbents for such applications as gas supply packages supplying process gases for manufacture of semiconductor products, flat-panel displays, solar panels, and the like, as well as to adsorbents for adsorbent-based heating and refrigeration systems and processes, and adsorbents for use in systems and processes for involving electrochemical cells, gas capture, gas sequestration, gas separation, and the like.

SUMMARY

The present disclosure generally relates to carbon pyrolyzate materials, including carbon adsorbents having utility for storage and dispensing of natural gas, e.g., in applications such as vehicular fuel usage and other implementations in which reversible adsorptive storage of natural gas is advantageous, as well as carbon adsorbents having utility for supplying process gases for manufacture of semiconductor products, flat-panel displays, solar panels, and the like, and for use in adsorbent-based heating and refrigeration systems and processes, and use in systems and processes involving electrochemical cells, gas capture, gas sequestration, gas separation, and the like.

In one aspect, the disclosure relates to high purity microporous carbon adsorbents prepared from renewable natural sources, to methods of making such carbon adsorbents, and to adsorbent-based gas storage and dispensing systems and processes utilizing such carbon adsorbents.

In another aspect, the disclosure relates to carbon adsorbent materials, and gas storage vessels and systems that incorporate such carbon adsorbent materials, as well as methods of making and using such materials, vessels, and gas storage and delivery systems.

In yet another aspect, the disclosure relates to a microporous adsorbent carbon derived from the pyrolysis of naturally-occurring carbohydrate source materials.

In a further aspect, the disclosure relates to a gas storage and delivery vessel comprising a high density monolithic or particulate carbon pyrolyzate of the disclosure.

In one specific aspect, the disclosure relates to a carbon pyrolyzate characterized by:

derivation from naturally-occurring carbohydrate source material;

<1% total ash content, as determined by the procedure of ASTM D2866-11;

piece density in a range of from 0.50 g/cc to 1.40 g/cc;

$N_2$ BET surface area greater than 750 m2/gm; and methane adsorption capacity, at 21° C. and 35 bar pressure, of greater than 100V/V.

In another specific aspect, the disclosure relates to a carbon pyrolyzate adsorbent characterized by:

derivation from naturally-occurring carbohydrate source material;

monolithic or particulate form;

<1% total ash content, as determined by the procedure of ASTM D2866-11;

piece density in a range of from 0.50 g/cc to 1.40 g/cc;

$N_2$ BET surface area greater than 750 m2/gm; and methane adsorption capacity, at 21° C. and 35 bar pressure, of greater than 100V/V.

A further aspect of the disclosure relates to a gas supply package, comprising a gas supply vessel holding an adsorbent of the present disclosure.

A still further aspect of the disclosure relates to a method of making a monolithic or particulate carbon adsorbent, comprising: compressing a precursor carbohydrate material into a near net shape preform; heating in a controlled manner in an inert gas environment to thermally decompose the carbohydrate to carbon; and, optionally, activating the carbon to increase surface area by one or more of (i) chemical activation, and (ii) physical activation.

Other aspects, features and embodiments of the disclosure will be more fully apparent from the ensuing description and appended claims.

DETAILED DESCRIPTION

Figure 1:
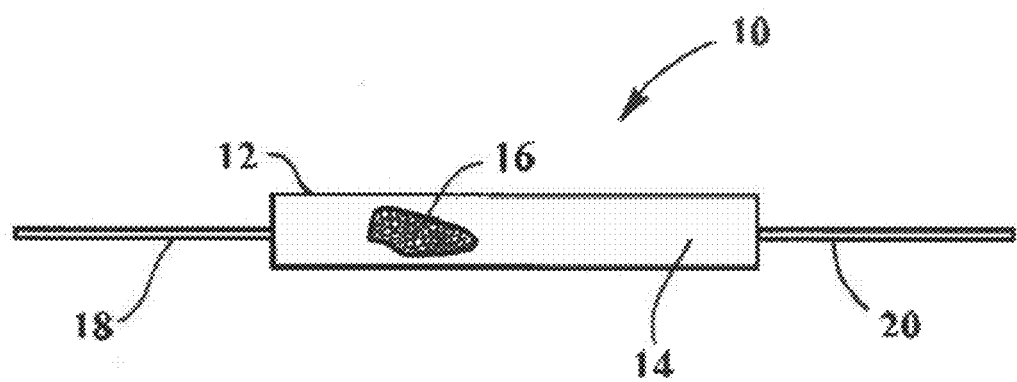
FIG. 1 is a schematic representation of an in-line gas purifier disposed in a process line for purification of gas flowed therethrough, utilizing a carbon pyrolyzate material according to one embodiment of the present disclosure.

The present disclosure generally relates to carbon pyrolyzate materials. In particular aspects, the disclosure relates more specifically to carbon adsorbents, such as a carbon adsorbent that is usefully employed for reversible adsorption of natural gas, and provides a natural gas storage medium on which natural gas can be sorptively held under gas storage conditions, and from which natural gas can be readily desorbed for dispensing and subsequent use. Such carbon adsorbent thus has utility in vehicular fuel supply applications in which natural gas is utilized for combustion in engines adapted to the use of natural gas. In other aspects, the disclosure relates to carbon adsorbents having utility for supplying process gases for manufacture of semiconductor products, flat-panel displays, solar panels, and the like, and for use in adsorbent-based heating and refrigeration systems and processes, as well as carbon pyrolyzate materials having utility in systems and processes involving electrochemical cells, gas capture, gas sequestration, gas separation, and the like.

In the aforementioned vehicular applications, carbon adsorbents of the present disclosure enable substantial quantities of natural gas to be held at significantly lower pressures, e.g., pressures on the order of 3.5 mPa (~500 psi), in relation to compressed natural gas (CNG) systems, which, as previously discussed, operate at pressures on the order of 25 mPa (over 3600 psi) and higher. As a result of such order of magnitude reduction of pressure, carbon adsorbent storage and dispensing systems of the present disclosure enable the cost of storage tanks and related compression components to be significantly reduced, with corresponding enhancement in the safety of operation of the natural gas supply system, relative to CNG systems.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure correspondingly contemplates such features, aspects and embodiments, or a selected one or ones thereof, in various permutations and combinations, as being within the scope of the present disclosure.

As used herein and in the appended claims, the following terms have the following meanings:

The singular forms "a", "and", and "the" include plural referents unless the context clearly dictates otherwise.

The term "high purity" in reference to carbon pyrolyzates of the present disclosure means that the carbon pyrolyzate is characterized by <1% total ash content, as determined by the procedure of ASTM D2866-11

The term "carbohydrates" refers to large biological molecules or macromolecules that are constituted by carbon (C), hydrogen (H), and oxygen (O) atoms. Such molecules may have a hydrogen:oxygen atom ratio of 2:1, and an empirical formula of $C_X(H_2O)_Y$, wherein X can be different from Y. Technically, these molecules are hydrates of carbon. Generally the term "carbohydrates" is considered synonymous with "saccharides." Carbohydrates reside in four chemical classes: monosaccharides, disaccharides, oligosaccharides, and polysaccharides.

The term "sugars" is a generalized name for sweet, short-chain, soluble carbohydrates, constituted by carbon, hydrogen, and oxygen atoms. Examples include arabinose, fructose, galactose, glucose (dextrose), lactose, maltose, mannose, sucrose, xylose, and their derivatives.

The term "monosaccharides" refers to simple sugars, the most basic unit, or building block, of carbohydrates. Examples include arabinose, deoxyribose, fructose (or levulose), galactose, glucose (or dextrose), glyceraldehyde (or glyceral), mannose, ribose, and xylose.

The term "disaccharides" refers to carbohydrates that are formed when two monosaccharides undergo a condensation reaction with the elimination of a water molecule. Examples include lactose, maltose, sucrose, cellobiose, and melibiose.

The term "oligosaccharides" refers to saccharide polymers that contain a small number (typically 3 to 9) of simple sugars (monosaccharides). Examples include cellodextrins, fructo-oligosaccharides, galacto-oligosaccharides, isomalto-oligosaccharides, maltodextrins, mannan oligosaccharides, and raffinose, among others.

The term "polysaccharides" refers to polymeric carbohydrate molecules that are constituted by long chains of monosaccharide units bound together by glycosidic linkages. Examples include agar, amylopectin, amylose, arabinoxylan, cellulose, chitin, chitosan, dextran, dextrin, fructan, galactomannan, glucan, glycogen, guar gum, hemicellulose, lentinan, lichenin, mannan, natural gum, pectin, polysaccharide peptide, sepharose, starches (e.g., of amaranth, arrowroot, banana, cassava, coconut, corn, pea, plantain, potato, quinoa, rice, sorghum, tapioca, wheat, etc.), welan gum, xanthan gum, and xylan, among others.

The term "cellulosic" refers to naturally occurring organic polymers of $(C_6H_{10}O_5)_n$ formula, comprising the structural fibrous cell wall of green plants, woods, nut shells, fruit pits, algae, etc. which are high molecular weight linear chain polymeric carbohydrates. Cellulosic materials comprise wood pulp, sawdust, newsprint, coconut shells, olives stones, peach stones, apricot pits, viscose, viscose-rayon, cotton, cotton linters, argan nutshell, macadamia nutshell, cellulose acetate, bacterial cellulose, lignin, blackthorn stones, walnut shells, date stones, rice husks, coffee parchment, coffee dregs, bagasse, sorghum millets straws, bamboo woods, mango pits, almond shells, corncobs, cherry stones, and grape seeds.

The term "macropores" refers to pores that are greater than 50 nm in size.

The term "mesopores" refers to pores that are from 2 nm to 50 nm in size.

The term "micropores" refers to pores that are smaller than 2 nm in size.

The term "ultra-micropores" refers to pores that are smaller than 0.7 nm in size.

The term "monolith" refers to carbon pyrolyzate material that is in a bulk form, having a block, brick, cylinder, puck, rod, or other geometrically regular or irregular bulk form, as distinguished from non-monolith carbon pyrolyzate forms such as beads, pellets, extrudates, powders, granules, or particulates. Monolithic carbon pyrolyzates of the present disclosure are advantageously formed as dense solid articles by pyrolysis of "near net shape" pyrolyzable precursor preforms that have a size and conformation that substantially correspond to the monolithic carbon pyrolyzate product. The resulting bulk form microporous carbon articles can be used as single piece adsorbent, or as a stack of multiple pieces (e.g., when the monolithic carbon pyrolyzate is of disk-shaped form and a stack of such disk-shaped bodies is vertically stacked in face-to-face abutment of successive disk-shaped bodies in the stack), or other arrangements in which the bulk form carbon pyrolyzate articles contact each other over substantial portion(s) of their respective surfaces, thereby eliminating the high void volumes that are observed in adsorbent vessels that are filled by beads, pellets, extrudates, powders, granules, or particulates of adsorbent, in which there is substantial interstitial volume and gross voids that resulted in diminution of sorptive capacity of the spatial volume containing such beads, pellets, extrudates, powders, granules, or particulates. In various specific embodiments, the monolith carbon pyrolyzate may have a dimensional character in which each of its (x,y,z) dimensions is at least 1 cm, e.g., wherein each of its (x,y,z) dimensions is in a range of from 1 cm to 25 cm, or higher.

The term "piece density" refers to mass per unit volume of a single piece of solid adsorbent, expressed in units of grams per cubic centimeter.

The term "binderless" used in reference to carbon pyrolyzates that are formed from pyrolyzable precursor material means that the pyrolyzable precursor composition contains no more than 5% by weight, based on total weight of the composition, of binder material, preferably containing no more than 2% by weight binder, on the same weight basis, and most preferably being devoid of any binder material. Binderless carbon pyrolyzates thus can be formed from precursor material that is sufficiently cohesive so that it can be formed in a near net shape form by press-molding or other shaping operations, and retain that near net shape form during and subsequent to the pyrolysis of the precursor material. In this respect, residual adsorbed species, e.g., water or moisture, resulting from standard processing operations such as milling and packaging are considered to be part of the raw source material and not to be additive or binder components of the raw source material.

The term "pyrolysis" refers to thermal decomposition of precursor material under conditions in which the precursor material is converted substantially to carbon.

The term "naturally-occurring carbohydrate source material" refers to carbohydrates, saccharides, sugars, starches, and the like, but excludes cellulosic materials and petroleum-based or petroleum-derived materials.

The term "near net shape" in reference to the pyrolyzable precursor article that is pyrolyzed to form the carbon pyrolyzate, means that the precursor article has a conformation that is consistent shape-wise with the product carbon pyrolyzate resulting from the pyrolysis. Such character of the pyrolyzable precursor article in relation to the pyrolyzed product article is highly advantageous, since it eliminates the need for extensive cutting, grinding, etc. to effect material removal in the processing of the carbon pyrolyzate, inasmuch as a reasonably consistent form factor is maintained in progressing from the precursor article to the carbon pyrolyzate adsorbent product.

In one aspect, the disclosure relates to a carbon pyrolyzate characterized by:
derivation from naturally-occurring carbohydrate source material;
<1% total ash content, as determined by the procedure of ASTM D2866-11;
piece density in a range of from 0.50 g/cc to 1.40 g/cc;
$N_2$ BET surface area greater than 750 m2/gm; and
methane adsorption capacity, at 21° C. and 35 bar pressure, of greater than 100V/V.

In various aspects, the present disclosure contemplates high purity carbon adsorbents formed as pyrolyzates of corresponding precursor material.

In one specific aspect, the disclosure relates to a carbon pyrolyzate adsorbent characterized by:
derivation from naturally-occurring carbohydrate source material;
monolithic form;
<1% total ash content, as determined by the procedure of ASTM D2866-11;
piece density in a range of from 0.50 g/cc to 1.40 g/cc;
N2 BET surface area greater than 750 m2/gm; and
methane adsorption capacity, at 21° C. and 35 bar pressure, of greater than 100V/V.

Such adsorbent may be characterized by the naturally-occurring carbohydrate source material comprising disaccharide, polysaccharide, or other carbohydrate material. In other embodiments, the naturally-occurring carbohydrate source material comprises material selected from the group consisting of lactose, starches, natural gums, chitin, chitosan, amylose, amylopectin, dextrins, maltodextrin, and mixtures of the foregoing.

The carbon pyrolyzate adsorbent may be in an activated form, e.g., wherein the activated form has been activated by chemical and/or physical activation. In one specific embodiment, the activated form has been chemically activated by reaction with an acid, e.g., an acid selected from the group consisting of hydrochloric acid, sulfuric acid, phosphoric acid, boric acid, and carbonic acid. In other embodiments, the activated form has been chemically activated by reaction with a hydroxide of sodium, lithium, potassium, calcium, or ammonium. In still other embodiments, the activated form has been physically activated by burn-off in exposure to $CO_2$, air, or steam in mixture with an inert gas, e.g., nitrogen or argon, or as a pure gas stream at temperature in a range of from 600° C. to 1200° C. In a specific embodiment, the activated form has been physically activated by burn-off in exposure to $CO_2$, air, or steam in mixture with an inert gas or as a pure gas stream at temperature in a range of from 600° C. to 1200° C.

The carbon pyrolyzate adsorbent of the disclosure in specific embodiments may be characterized by any one or more of the following characteristics: having less than 0.5% total ash content, as determined by the procedure of ASTM D2866-11; having a piece density of from 0.55 g/cc to 1.35 g/cc; having a piece density of from 0.60 g/cc to 1.30 g/cc; having a bulk density of from 0.5 g/cc to 1.3 g/cc; the adsorbent being binderless; having $N_2$ BET surface area in a range of from 750 to 3000 m2/gram; having at least 40% of its pore volume in micropores having size in a range of from 0.3 nm to 2.0 nm; having at least 70% of its pore volume in micropores having size in a range of from 0.3 nm to 2.0 nm; having from 40% to 90%, or higher, of its pore volume in micropores having size in a range of from 0.3 nm to 2.0 nm; having methane adsorption capacity, at 21° C. and 35 bar pressure, of greater than 110V/V; having methane adsorption capacity, at 21° C. and 35 bar pressure, of greater than 125V/V; having methane adsorption capacity, at 21° C. and 35 bar pressure, in a range of from 140V/V to 220V/V; and having methane adsorption working/delta capacity between 35 bar and 1 bar, of at least 75V/V, e.g., in a range of from 75 to 125V/V.

The carbon pyrolyzate adsorbent of the disclosure in other embodiments may have adsorbed thereon gas selected from the group consisting of hydrides, halides, organometallics, hydrogen, $CO_2$, CO, methane, $C_2$-$C_4$ hydrocarbons (e.g., ethane, ethylene, propane, propylene, butane, butylene), natural gas, and mixtures of two or more of the foregoing.

In specific embodiments, the adsorbed gas comprises gas selected from the group consisting of arsine, phosphine, germane, diborane, silane, disilane, trimethyl silane, tetramethyl silane, methane, $C_2$-$C_4$ hydrocarbons (e.g., ethane, ethylene, propane, propylene, butane, butylene), acetylene, hydrogen, stibine, boron trichloride, boron trifluoride, diboron tetrafluoride, nitrogen trifluoride, germanium tetrafluoride, silicon tetrafluoride, arsenic trifluoride, arsenic pentafluoride, phosphine trifluoride, phosphorous pentafluoride, fluorine, chlorine, hydrogen fluoride, hydrogen sulfide, hydrogen selenide, hydrogen telluride, halogenated methanes, halogenated ethanes, allane, stannane, trisilane, ammonia, carbon monoxide, carbon dioxide, carbonyl fluoride, nitrous oxide, natural gas, isotopically enriched variants of the foregoing, and combinations of two or more of the foregoing.

The disclosure in a further aspect relates to a gas supply package, comprising a gas supply vessel holding an adsorbent of the present disclosure as variously described herein. The vessel in specific embodiments is characterized by an adsorbent fill of at least 0.1 grams of the adsorbent per cc of interior volume of the vessel, preferably an adsorbent fill of at least 0.6 grams of the adsorbent per cc of interior volume of the vessel, more preferably an adsorbent fill of at least 0.65 grams of the adsorbent per cc of interior volume of the vessel, and most preferably an adsorbent fill of at least 0.75 grams of the adsorbent per cc of interior volume of the vessel, e.g., in a range of from 0.5 to 0.95, or higher, grams of the adsorbent per cc of interior volume of the vessel.

In another specific embodiment, the disclosure relates to a gas supply package as variously described herein, having natural gas adsorbed on the adsorbent.

The disclosure in another aspect relates to a method of making a monolith carbon adsorbent, comprising: compressing a precursor carbohydrate material into a near net shape preform, heating in a controlled manner in an inert gas environment to thermally decompose the carbohydrate to carbon; and, optionally, activating the carbon to increase surface area by one or more of (i) chemical activation, and (ii) physical activation.

To achieve a high level of practical utility for adsorbed natural gas (ANG) storage and delivery, the carbon pyrolyzate adsorbent of the present disclosure is advantageously manufactured as a high density, monolithic, shaped space-filling form material that provides both high gravimetric (storage/gram) and volumetric (storage/liter) gas storage density. The carbon pyrolyzate adsorbent is microporous, and advantageously includes porosity having an effective pore diameter matched to the targeted adsorbate gas for the application. The porosity preferably includes less than 60% of the pore volume in mesopores (pores having a diameter of greater than 2 nm but less than 50 nm) and/or in macropores (pores of greater than 50 nm diameter). More preferably, the percentage of such pores (mesopores+macropores) is less than 45%, and most preferably the percentage of such pores (mesopores+macropores) is less than 30%.

The carbon pyrolyzate adsorbent of the disclosure possesses high methane adsorption capacity, i.e., at least 100 V/V at 35 bar (508 psig) and 21° C. preferably greater than 110 V/V at 35 bar (508 psig) and 21° C., more preferably greater than 125 V/V at 35 bar (508 psig) and 21° C., and most preferably greater than 175 V/V at 35 bar (508 psig) and 21° C., e.g., in a range of from 100 to 250 V/V at 35 bar (508 psig) and 21° C., and more preferably in a range of from 140 to 220 V/V at 35 bar (508 psig) and 21° C. The carbon pyrolyzate adsorbent also exhibits rapid adsorption/desorption rates, with a low methane heat of adsorption and a high heat capacity permitting the adsorbent to manage heat effects and minimize temperature changes during adsorption and desorption. The adsorbent advantageously has a hydrophobic character. The adsorbent in various embodiments is prepared in a monolithic form and can be molded into a variety of shapes from the precursor materials described herein. In various embodiments, the carbon pyrolyzate adsorbent exhibits density of 1.1 g/cc or higher and is hydrophobic with a methane capacity, at 35 bar pressure and temperature of 21° C., of at least 170 V/V. The carbon pyrolyzate adsorbents of such type advantageously possesses a moderate heat capacity (e.g., on the order of 1 J/g-K) and a high thermal conductivity (e.g., ~0.8 W/m-K) to provide for heat dissipation.

The carbon pyrolyzate adsorbent of the present disclosure thus can be provided as a high surface area, microporous carbon adsorbent in a high density monolithic form and can be shaped as desired for end use of the product carbon pyrolyzate adsorbent. The carbon pyrolyzate adsorbent is advantageously formed from naturally occurring and abundant carbon source materials. To keep processing cost low and the final product pure, natural sources are utilized that are high in carbon content, and preferably are free or substantially free of inorganic contaminants such as transition metals, alkali or alkaline earth metals, halides, salts, etc. The carbon pyrolyzate provides a low-cost, highly efficiency adsorbent for the storage of natural gas, with characteristics in specific embodiments including a surface area that is greater than 750 m$^2$/g, a piece density that is greater than 0.8 g/cc, and a bulk density that is greater than 0.5 g/cc.

Carbon pyrolyzate materials of the present disclosure can be formed of a variety of precursor source materials, including, without limitation, sucrose and other related sugars (e.g., arabinose, fructose, galactose, glucose (dextrose), lactose, maltose, mannose, xylose, and their derivatives), as well as starches and polysaccharides. These raw source materials can be easily formed or pressed into monolithic shapes before undergoing subsequent carbonization and activation. Most simple sugars are composed of 40-42% carbon, and are commercially available at low cost in large volumes, and in high purity. They are naturally renewable. Thermal decomposition of natural sugars yields a non-graphitizing hard carbon with a structure similar to that of PVDC char. Byproducts of the non-oxidative pyrolysis of sugar are primarily water vapor with low levels of carbon dioxide and/or carbon monoxide. These are easily managed process effluents.

Sugars when used as a carbon pyrolyzate source material can be pyrolyzed at any suitable temperature, e.g., temperature of at least 400° C. and up to 1200° C., or higher, in an inert atmosphere. Activation can be carried out in any suitable manner, and may be carried out by chemical and/or physical activation techniques, e.g., (1) chemical activation by reaction of the pyrolyzed carbon with KOH, LiOH, NaOH, NH$_4$OH, NaHCO$_3$, (NH$_4$)$_2$SO$_4$, H$_2$SO$_4$, HCl, or H$_1$PO$_4$ at room temperature, followed by heating, and then removal of any residual activation chemistry by appropriate acid or base neutralization wash/water rinse filtering and drying; or (2) physical activation by high-temperature exposure of the carbon to steam, CO$_2$, air, or other oxidizing gas, or by any combination of these various techniques.

In various embodiments, the carbon pyrolyzate adsorbent comprises a binderless, high density carbon monolith that is in a shape-filling form with respect to the vessel or other containment structure in which the adsorbent is to be deployed as a gas storage and dispensing medium. As used in such context, the term "high density" means that the carbon pyrolyzate has a piece density of at least 0.50 g/cc, preferably at least 0.70 g/cc, and most preferably greater than 0.75 g/cc, e.g., in a range of from 0.50 g/cc to 1.70 g/cc.

In specific embodiments, the carbon pyrolyzate and carbon adsorbents of the disclosure can be derived from naturally-occurring carbohydrate source materials comprising one or more of (i) monosaccharides, (ii) disaccharides, (iii) oligosaccharides, and/or (iv) polysaccharides.

For example, the carbon adsorbent can be derived from natural source material(s) and have an N$_2$ BET surface area of at least 750 m$^2$/g, preferably at least 900 m$^2$/g; and most preferably greater than 1000 m$^2$/g, e.g., in a range of from 750 m$^2$/g to 3000 m$^2$/g.

In various embodiments, the microporous carbon adsorbent material of the disclosure may have at least 50% of its pore volume constituted by pores of size between 0.3 nm and 2.0 nm, preferably with at least 70%, and more preferably greater than 75%, e.g., up to 95% or higher, of its pore volume constituted by pores of size between 0.3 nm and 2.0 nm in size.

Other embodiments of the disclosure relate to monolithic form carbon adsorbent derived from naturally-occurring carbohydrate source material(s), wherein the carbon adsorbent has a methane adsorption capacity at 21° C. and 35 bar of at least 100V/V, preferably at least 110V/V, and more preferably at least 125V/V, e.g., in a range of from 140 to 220V/V.

In other aspects, the present disclosure relates to a gas supply vessel containing the carbon pyrolyzate adsorbent, wherein the carbon adsorbent fill density within the vessel is at least 0.1 g of carbon adsorbent/cc of vessel volume occupied by the adsorbent, preferably at least 0.6 g/cc, more preferably 0.65 g/cc, and most preferably at least 0.75 g/cc, e.g., in a range of from 0.5 g/cc to 1.0 g/cc or higher.

Further aspects of this disclosure relate to a gas supply vessel containing a natural carbohydrate-derived carbon adsorbent having adsorbed thereon gas selected from the group consisting of (i) hydrides, (ii) halides, (iii) organometallics, (iv) hydrogen, (v) carbon dioxide, (vi) carbon monoxide, (vii) methane, (viii) natural gas, (ix) ethane, (x) ethylene, (xi) propane, (xii) propylene, (xiii) butane, (xiv) butylene, and combinations of two or more of these gases.

Still further aspects of this disclosure relate to a gas supply vessel containing a natural carbohydrate-derived carbon adsorbent having adsorbed thereon gas selected from the group consisting of arsine, phosphine, germane, diborane, silane, disilane, trimethyl silane, tetramethyl silane, methane, $C_2$-$C_4$ hydrocarbons (e.g., ethane, ethylene, propane, propylene, butane, butylene), acetylene, hydrogen, stibine, boron trichloride, boron trifluoride, diboron tetrafluoride, nitrogen trifluoride, germanium tetrafluoride, silicon tetrafluoride, arsenic trifluoride, arsenic pentafluoride, phosphine trifluoride, phosphorous pentafluoride, fluorine, chlorine, hydrogen fluoride, hydrogen sulfide, hydrogen selenide, hydrogen telluride, halogenated methanes, halogenated ethanes, allane, stannane, trisilane, ammonia, carbon monoxide, carbon dioxide, carbonyl fluoride, nitrous oxide, natural gas, isotopically enriched variants of the foregoing, and combinations of two or more of the foregoing.

In other aspects, the disclosure relates to gas adsorption, storage, transportation, and/or delivery systems incorporating the vessel(s) of the above-described types, containing carbon adsorbent of the present disclosure.

In various specific embodiments, the carbon pyrolyzate of the present disclosure may be characterized by at least one of: having been formed from naturally-occurring carbohydrate source material(s); having a monolithic form; <1% total ash content, as determined by the procedure of ASTM D2866-11; monolithic form piece density of from 0.50 g/cc to 1.70 g/cc; $N_2$ BET surface area of greater than 750 m²/g; methane adsorption capacity at 21° C. and 35 bar pressure of greater than 100V/V, e.g., greater than 110V/V, greater than 125V/V, or in a range of from 100 to 220V/V; at least 40% of its porosity, e.g., greater than 50%, 60%, 70%, or 80% of its porosity, up to 90% or higher, constituted by micropores, having pore size between 0.3 nm and 2.0 nm, a thermal conductivity of >0.6 W/mK; and a methane adsorption working/delta capacity of 75V/V or greater between 35 bar at 21° C. and 1 bar at 21° C. (the methane adsorption working/delta capacity is the volume of sorbate gas that can be adsorbed on the carbon adsorbent at the higher pressure (35 bar) and subsequently released from the carbon adsorbent by desorption at the lower pressure condition (1 bar) when both are measured at a temperature of 21° C.

The disclosure in another aspect relates to naturally-occurring carbohydrate source material compressed into near net shape preforms under compressive force of 4,000 psi or greater, preferably between 5,000 psi and 50,000 psi, prior to thermal decomposition.

The disclosure in yet another aspect relates to thermal conversion of the consolidated near net shape carbohydrate preform to carbon by treatment to a temperature ranging from 600° C. to 1200° C. to yield a pyrolyzate carbon.

The disclosure in a further aspect relates to activation of the formed carbohydrate-derived pyrolyzate carbon by chemical or physical means to enhance surface area and micropore volume thereof.

Using naturally sourced carbohydrate materials in accordance with the present disclosure, carbon pyrolyzate adsorbents can be made at relatively high yields, low cost, high purity, and minimized environmental hazards. Preparing compressed preforms of the natural polymer source material(s) enables the production of high density monolithic forms of the carbon pyrolyzate adsorbent. Pyrolysis of natural source materials, e.g., polysaccharides, results in easily managed byproducts. Physical activation at elevated temperature with steam, $CO_2$, or air in combination with inert purge gas such as nitrogen or argon can be utilized to achieve very precise control over adsorbent properties such as surface area, bulk density, and pore-size distribution, without introducing new impurities or contaminants. Self-adherent (cohesive) precursors enable processing without the use of binders that may alter the desired properties of the carbon adsorbent, while still achieving adsorbent articles of high density, superior strength and durability, high heat capacity, and good thermal conductivity. As a result, it is possible to produce a solid adsorbent carbon with high gas adsorption capacity, low heating during adsorption to enable rapid gas filling, minimized chemical reactivity with the adsorbed gas for shelf storage and transport stability and maximized gas delivery, and low cooling upon gas delivery to enable sustainable high use rates and a sustainable supply chain.

It will be recognized that the carbon pyrolyzate adsorbent of the present disclosure may incorporate any of the various characteristics and features described hereinabove, and any combinations of two or more of such characteristics and features.

Carbon pyrolyzate in accordance with the present disclosure may be provided in any suitable size, shape and form. For example, the carbon pyrolyzate in various embodiments can be particulate in character, and in specific embodiments particles may be in a size (diameter or major dimension) range of from 0.3 to 4 mm, with a piece density that is greater than 0.8 g/cc, or with size and density of any other suitable values. In other embodiments, the carbon pyrolyzate may be in a monolithic form. Carbon pyrolyzate monoliths useful in the broad practice of the present disclosure may in specific embodiments include gross brick, block, tablet, and ingot forms, as bulk forms. In various embodiments, carbon pyrolyzate monoliths may have three-dimensional (x, y, z) character wherein each of such dimensions is greater than 1.5, and preferably greater than 2 centimeters.

In various carbon pyrolyzate embodiments, the carbon pyrolyzate is provided as a carbon pyrolyzate adsorbent monolith, in the form of disk-shaped articles of a same diameter, enabling such articles to be stacked in a vertical stack in a gas storage and dispensing vessel for reversible storage of gas thereon.

Referring now to the drawings, FIG. 1 is a schematic representation of an in-line gas purifier 10 disposed in a process line for purification of gas flowed therethrough, utilizing a carbon pyrolyzate material according to one embodiment of the present disclosure.

As illustrated, the purifier 10 comprises a purifier vessel 12 of cylindrical elongate shape, coupled in gas flow relationship with a gas inlet line 18 at a first end of the vessel, and coupled in gas flow relationship with a gas outlet line 20 at a second end of the vessel opposite the first end thereof. The purifier vessel 12 includes a circumscribing cylindrical wall 14 defining an enclosed interior volume therewithin, bounded by end walls at the first and second ends of the vessel. In the interior volume is disposed a particulate carbon pyrolyzate adsorbent in accordance with the present disclosure. Such adsorbent has selective adsorptive affinity for one or more components of a gas mixture flowed from gas inlet line 18 through the interior volume of the vessel 12 to the gas outlet line 20, so that such components are selectively removed from the gas mixture flowed through the purifier to produce a purified gas depleted in such components.

The gas inlet line 18 and gas outlet line 20 may be part of flow circuitry in a semiconductor manufacturing facility, in which the gas mixture flowed to the purifier from gas inlet line 18 is desired to be purified of the selectively removable components. The purifier thus may purify gas to be utilized in a specific gas-utilizing operation in the semiconductor manufacturing facility, or the purifier may be used to remove residual toxic or otherwise hazardous components from the gas prior to its release is effluent from the facility. The purifier may be deployed in clean room and lithography track applications. The carbon pyrolyzate adsorbent material may thus be utilized in the purifier in a particulate form, as a powder, beads, pellets, or the like. Alternatively, if the pressure drop in the purifier is sufficiently low, the carbon pyrolyzate adsorbent material may be provided in a monolithic form. As a still further arrangement in various embodiments, the carbon pyrolyzate adsorbent material may be provided on a support material or batting, to effect contact of the gas with the adsorbent material so that undesired components are adsorptive removed therefrom by such contacting.

Figure 2:
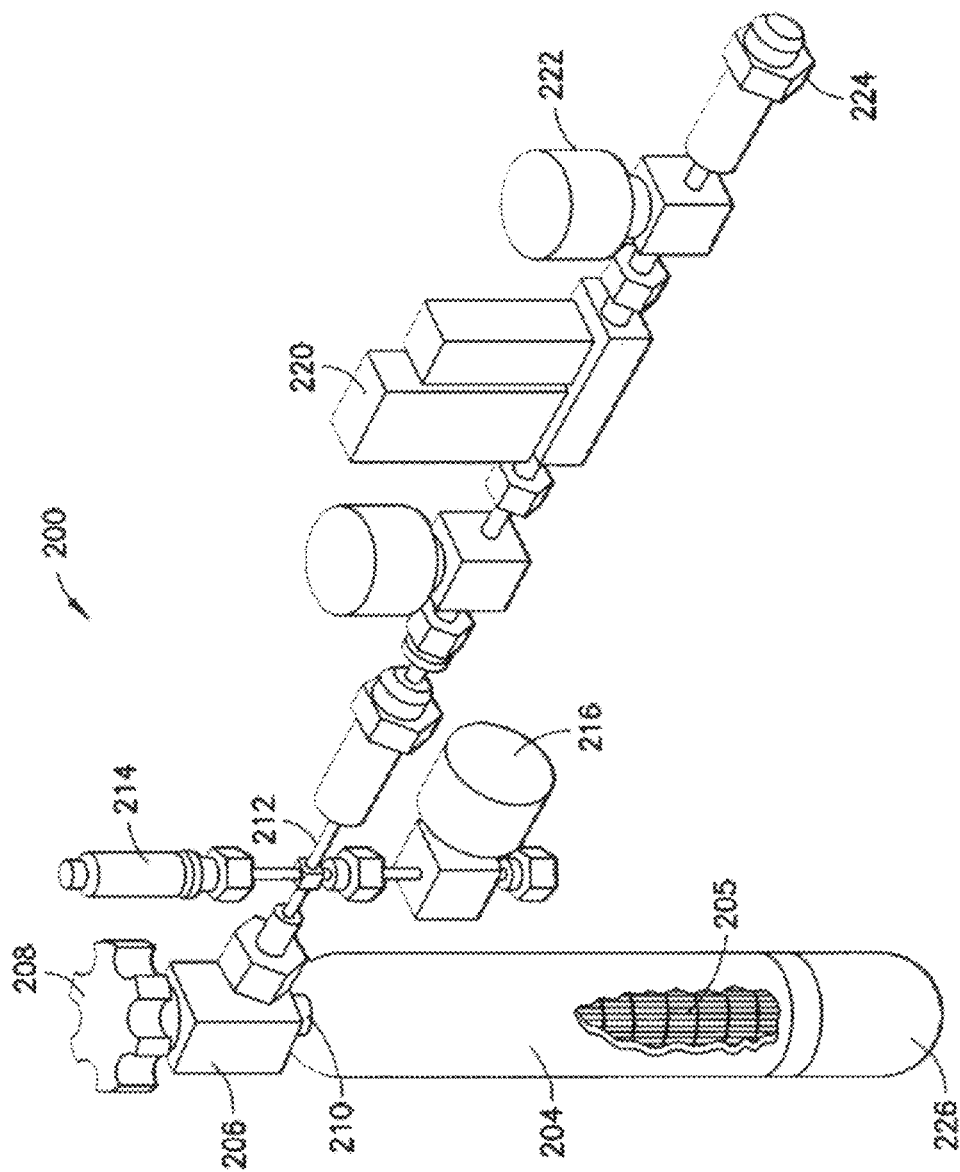
FIG. 2 is a schematic representation of a storage and delivery system utilizing a carbon monolithic adsorbent, according to another embodiment of the present disclosure.

FIG. 2 is a schematic representation of a storage and delivery system 200 comprising a gas supply package utilizing a carbon monolithic adsorbent, according to another embodiment of the present disclosure.

As shown, the storage and delivery system 200 comprises a storage and dispensing vessel 204 that is joined at its upper portion to a valve head 206 comprising part of a dispensing assembly including manual actuator 208 for the valve head on the cylinder. In lieu of such manual actuator, an automatic valve actuator could be employed, such as a pneumatic valve actuator, or actuator of other suitable type.

The valve head contains a valve (not shown) that is translatable between fully open and fully closed positions, to either dispense gas from the vessel 204 when the valve is opened, or to retain gas stored in the vessel 204 when the valve is in a fully closed position. When the valve is open for dispensing, gas can be discharged from the vessel by any suitable modality, including connecting the vessel to flow circuitry in which pressure lower than the pressure in the vessel is maintained, so the gas is desorbed by such dispensing operation and dispensed from the vessel. Additionally, or alternatively, the vessel may be heated to effect desorption of gas, for gas dispensing from the vessel with the valve being open for such dispensing. As another additional, or alternative, mode of operation, a carrier gas can be flowed through the interior volume of the vessel, to effect desorption by the resulting mass transfer concentration gradient between the carrier gas and the adsorbed gas on the carbon pyrolyzate adsorbent material in the vessel.

The vessel 204 can be formed of any suitable material of construction, e.g., comprising material such as metals, glasses, ceramics, vitreous materials, polymers, and composite materials. Illustrative metals for such purpose include steel, stainless steel, aluminum, copper, brass, bronze, and alloys thereof. The valve head is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for matably engaging the dispensing assembly with downstream piping, valving, or other structure associated with the locus of use of the desorbed gas, e.g., a chemical synthesis reactor or a microelectronic product manufacturing tool. The gas storage and dispensing vessel 204 is shown partially broken away to show the interior monolithic carbon pyrolyzate adsorbent comprising a vertically extending stack of discs 205, which may constitute a carbon pyrolyzate material of the present disclosure, having suitable porosity and physical characteristics. The discs 205 may be of a same or similar diameter (transverse dimension, perpendicular to the longitudinal axis of the vessel 204), with successively adjacent stacked discs in the stack abutting one another in face-to-face contact.

The successive discs in the stacked array of discs in the vessel interior volume may each be of a cylindrical form, with circular end faces that fully abut circular end faces of adjacent discs in the stack, or the discs may alternatively be beveled on their edges, or have channels on their periphery to facilitate gas ingress and egress throughout the stack of adsorbent articles.

Figure 3:
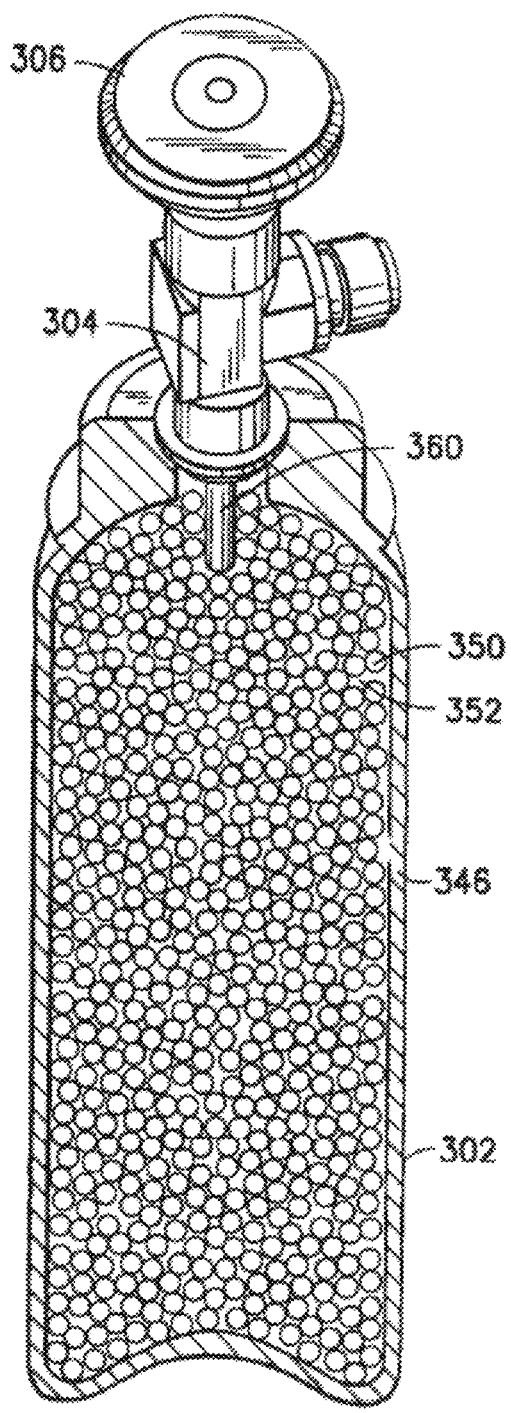
FIG. 3 is a perspective cross-sectional view of a gas supply package including a gas storage and dispensing vessel, showing the interior structure of such vessel, as containing a particulate carbon adsorbent, according to a further embodiment of the disclosure.

FIG. 3 is a perspective cross-sectional view of a gas supply package including a gas storage and dispensing vessel 302, showing the interior structure of such vessel, as containing a particulate carbon adsorbent, according to a further embodiment of the disclosure.

As shown, the vessel 302 comprises a wall 346 enclosing an interior volume 352 of the vessel, and containing a particulate carbon pyrolyzate adsorbent 350 in accordance with the present disclosure, e.g., in the form of spherical beads of adsorbent. At the upper end of the vessel, at the port to which the valve head 304 is joined, a porous sintered tube 360, or other gas-permeable structure, may be provided, serving to prevent entrainment in the dispensed gas of particulate solids from the bed of the carbon pyrolyzate adsorbent material. The valve head 304 is coupled with a manual valve actuator wheel 306, by which the valve (not shown) in the valve head 304 may be manually translated between fully open and fully closed positions, for dispensing in the open position and gas storage in the vessel, in the fully closed position.

In addition to adsorbent utility, the carbon pyrolyzate materials of the present disclosure may variously be employed in electrodes or other energy storage or energy transfer components of electrochemical energy devices, e.g., in energy storage applications such as ultracapacitors.

Figure 4:
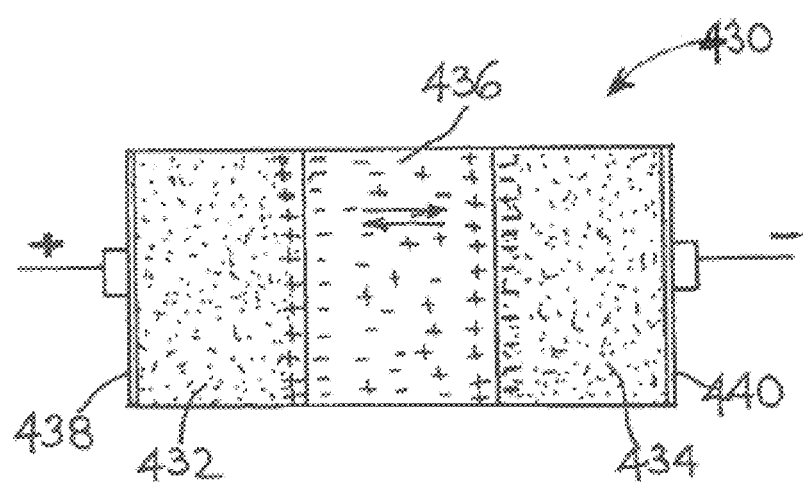
FIG. 4 is a schematic representation of an electrochemical energy device comprising an arrangement of carbon pyrolyzate electrodes forming an EDLC conformation with electrolyte therebetween, according to one embodiment of the present disclosure.

FIG. 4 is a schematic representation of an illustrative electrochemical energy device comprising an arrangement of carbon pyrolyzate electrodes of the present disclosure, forming an electric double layer capacitor (EDLC) conformation with electrolyte therebetween, according to one embodiment of the disclosure.

The electrochemical energy device 430 of FIG. 4 comprises an arrangement of carbon electrodes 432 and 434 forming an EDLC conformation with electrolyte 436 therebetween, according to another embodiment of the present disclosure. Electrode 432 is metallized on an outer face thereof to constitute current collector 438 thereon, and electrode 434 is correspondingly metallized on an outer face thereof to constitute current collector 440 thereon.

The carbon pyrolyzate material of the present disclosure may alternatively be employed for construction of electrochemical energy devices of other configurations.

Regardless of the specific configuration employed for the electrochemical energy device, the carbon pyrolyzates with their associated metallization elements form electrodes that are electrically coupled to respective terminals, and upon addition of suitable electrolyte form EDLC cells. The electrolyte may comprise a liquid-phase electrolyte, of an organic or aqueous character, or may comprise a solid state electrolyte material.

The carbon pyrolyzate material of the present disclosure thus can be used to fabricate electrodes that have the capacity to handle high current densities, that exhibit high current efficiency, that possess low capacity fade during repetitive cycling, and that otherwise exhibit high capacitance, high power, and high energy density, and accommodate high voltages in electrochemical double layer capacitor devices.

It will therefore be recognized that a wide variety of carbon pyrolyzate materials may be formed in accordance with the present disclosure utilizing naturally-occurring carbohydrate source materials, and that a wide variety of naturally-occurring carbohydrate source materials, including sugars, starches, polysaccharides, maltodextrins, etc., may be employed to make such carbon pyrolyzate materials.

Figure 5:
FIG. 5 is a photograph of tablets of natural carbohydrate formed by direct compression and showing good adhesion of particles and having a raw material density in excess of 1.1 g/cc.

FIG. 5 is a photograph of compressed tablets of natural carbohydrate showing good adhesion of particles and having a raw material density in excess of 1.1 g/cc.

Figure 6:
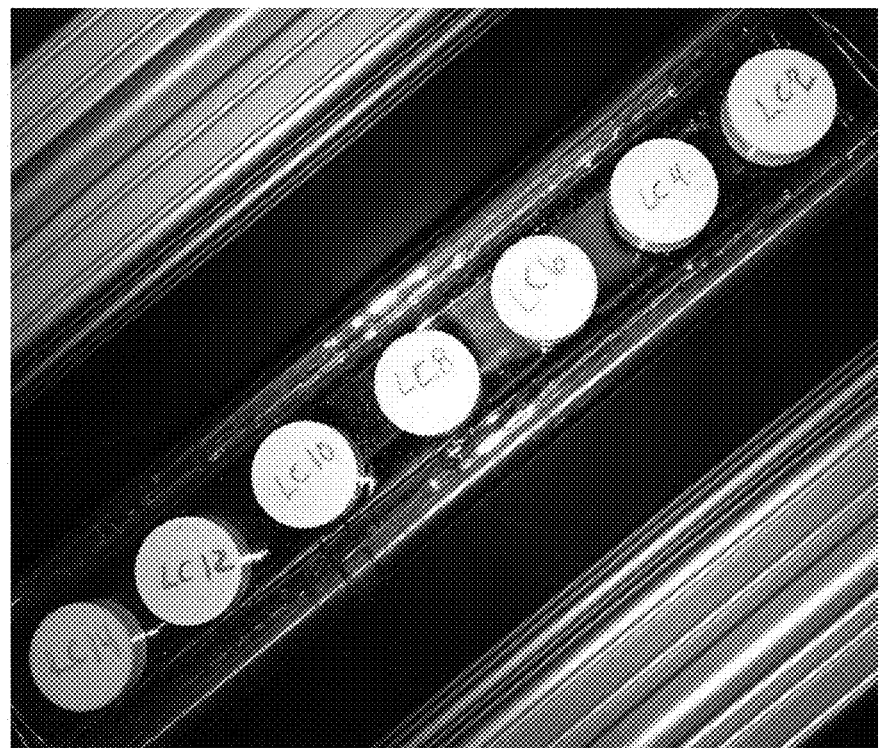
FIG. 6 is a photograph of blended and consolidated sugar tablets having a piece density of >1.25 g/cc as they are loaded into a furnace for pyrolysis.

FIG. 6 is a photograph of blended and consolidated sugar tablets having a piece density of >1.25 g/cc as they are loaded into a furnace for pyrolysis.

Figure 7:
FIG. 7 is a photograph of strong self-adherent polysaccharide cylinder-shaped blocks with a measured density of >1.32 g/cc.

FIG. 7 is a photograph of strong self-adherent polysaccharide cylinder-shaped blocks with a measured density of >1.32 g/cc.

Figure 8:
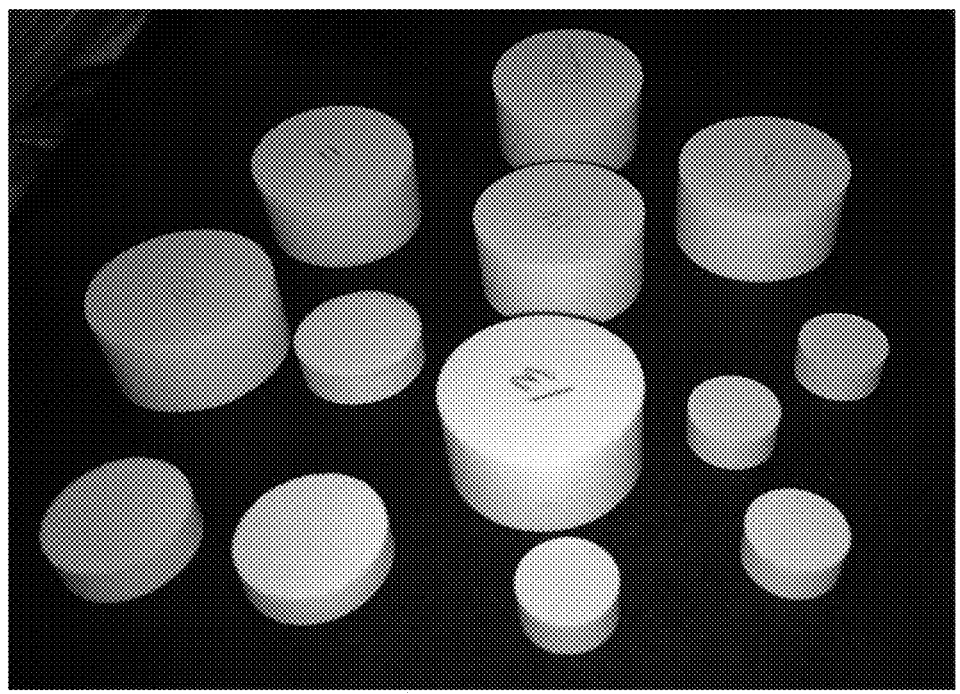
FIG. 8 is a photograph showing a range of sizes of disks compressed from various natural starch sources.

FIG. 8 is a photograph showing a range of sizes of disks compressed from various natural starch sources.

Figure 9:
FIG. 9 is a photograph of several starch disks that have been thermally converted to carbon pyrolyzate having a density greater than 1.25 g/cc.

FIG. 9 is a photograph of several starch disks that have been thermally converted to carbon pyrolyzate having a density greater than 1.25 g/cc.

Figure 10:
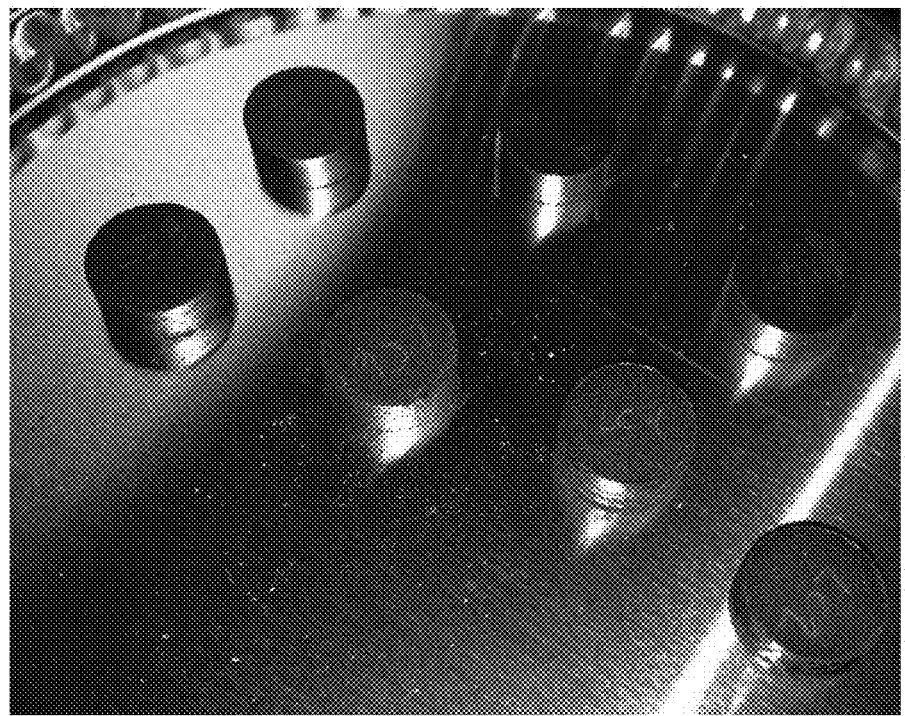
FIG. 10 is a photograph of pyrolyzed sugar tablets with average piece density of 0.95 g/cc.

FIG. 10 is a photograph of pyrolyzed sugar tablets with average piece density of 0.95 g/cc.

Figure 11:
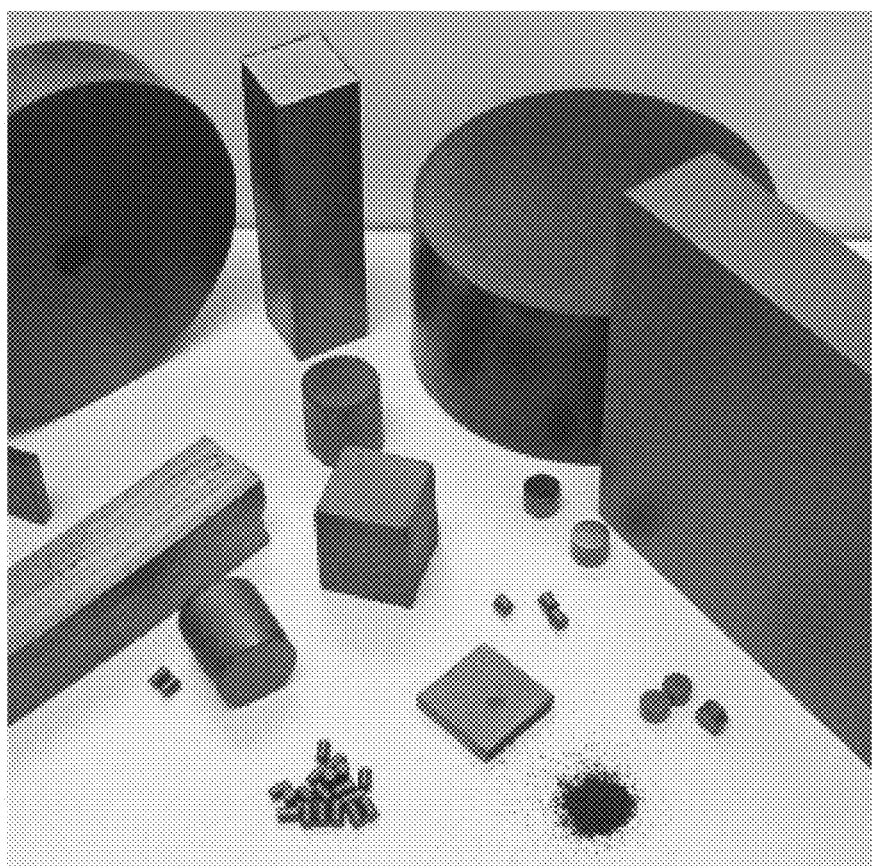
FIG. 11 is a photograph showing a variety of shapes and sizes of formed carbon pyrolyzate adsorbent pieces prepared via preforming and controlled pyrolysis.

FIG. 11 is a photograph showing a variety of shapes and sizes of formed carbon pyrolyzate adsorbent pieces prepared via preforming and controlled pyrolysis.

Figure 12:
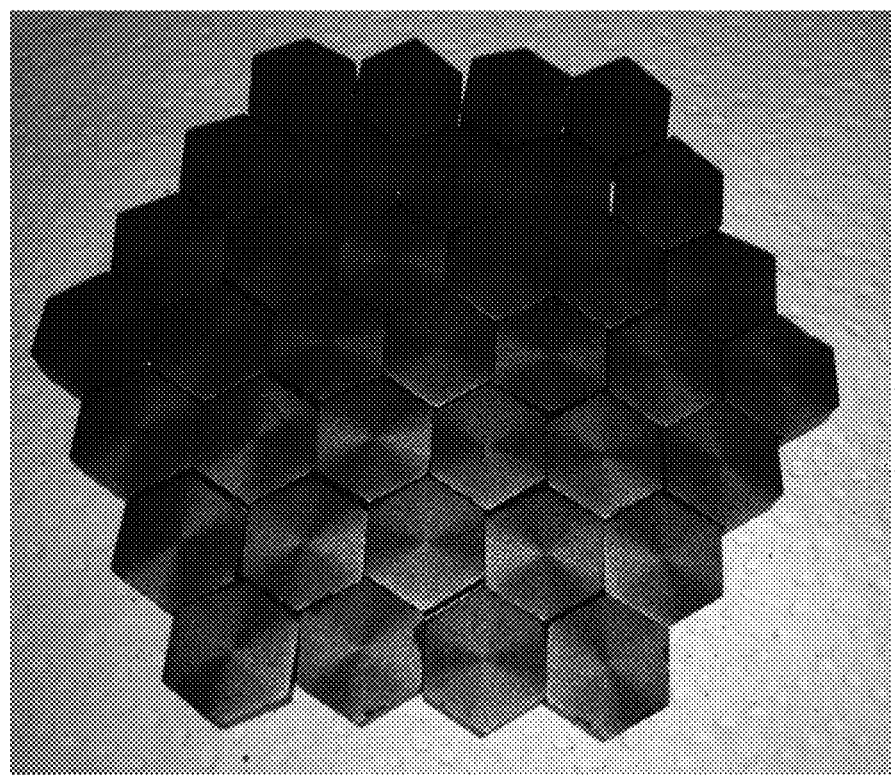
FIG. 12 is a photograph of one embodiment of carbon pyrolyzate adsorbent articles having a space-filling shape, which can be arranged so that adjacent carbon pyrolyzate adsorbent articles are in contact with one another, so that the corresponding array of carbon pyrolyzate adsorbent articles can be employed for maximizing adsorbent density within the enclosed volume of an adsorbent vessel adapted for holding gas for which the carbon pyrolyzate adsorbent has sorptive affinity.

FIG. 12 is a photograph of one embodiment of carbon pyrolyzate adsorbent articles having a space-filling shape, which can be arranged so that adjacent carbon pyrolyzate adsorbent articles are in contact with one another, so that the corresponding array of carbon pyrolyzate adsorbent articles can be employed for maximizing adsorbent density within the enclosed volume of an adsorbent vessel adapted for holding gas for which the carbon pyrolyzate adsorbent has sorptive affinity.

Figure 13:
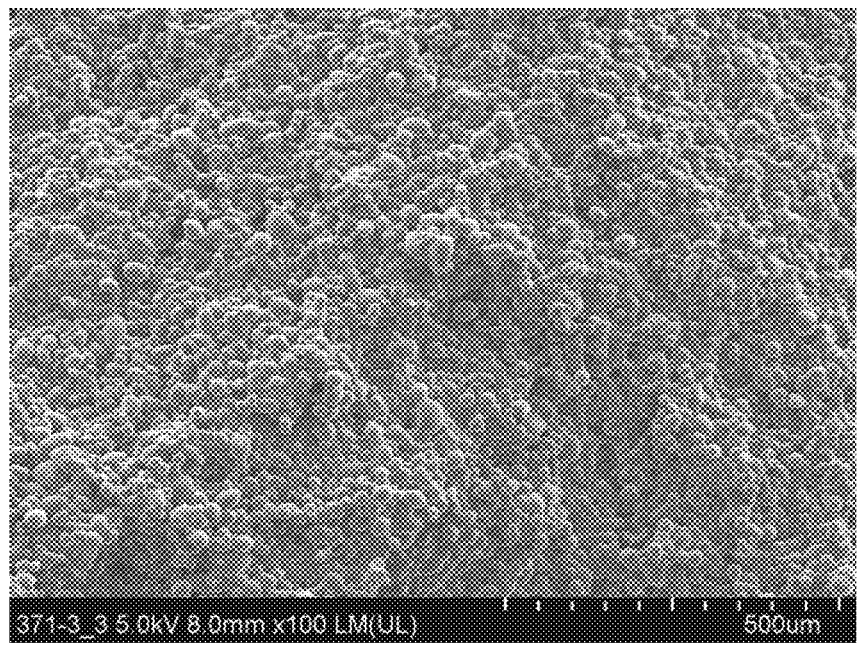
FIG. 13 is an SEM micrograph of a cleaved piece of consolidated carbon adsorbent monolith derived from compressed potato starch having a density of 1.29 g/cc, a surface area of 1300 sq.m/g, and a methane capacity of 116V/V.

FIG. 13 is an SEM micrograph of a cleaved piece of consolidated carbon adsorbent monolith derived from compressed potato starch having a density of 1.29 g/cc, a surface area of 1300 sq.m/g, and a methane capacity of 116V/V.

Figure 14:
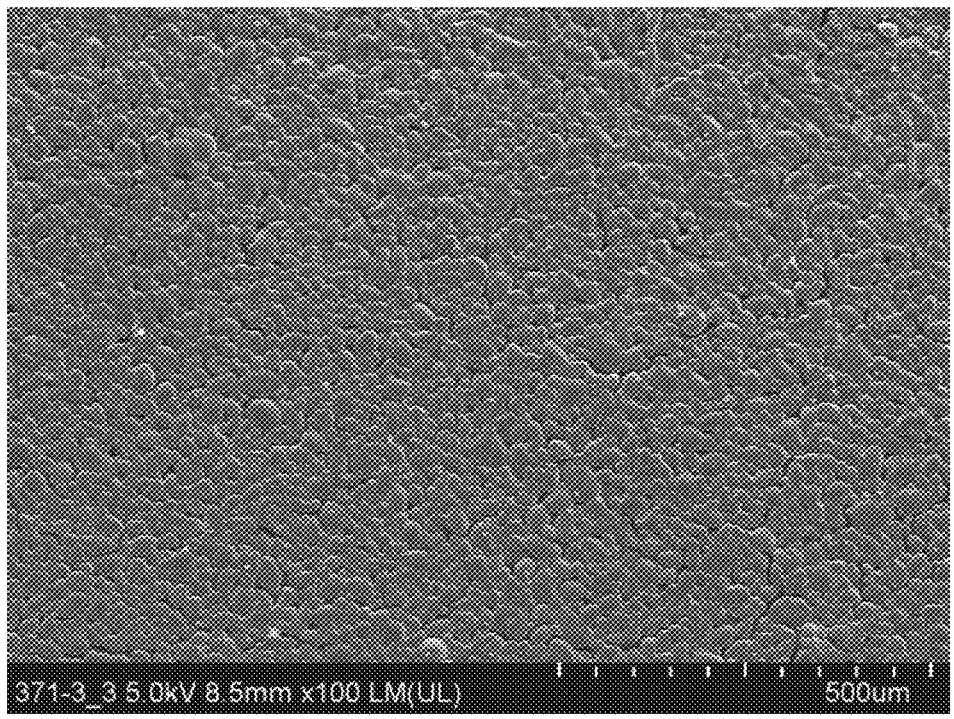
FIG. 14 is an SEM micrograph of the surface of the same consolidated carbon adsorbent monolith of FIG. 13 derived from compressed potato starch having a density of 1.29 g/cc, a surface area of 1300 sq.m/g, and a methane capacity of 116V/V.

FIG. 14 is an SEM micrograph of the surface of the same consolidated carbon adsorbent monolith of FIG. 13 derived from compressed potato starch having a density of 1.29 g/cc, a surface area of 1300 sq.m/g, and a methane capacity of 116V/V.

Figure 15:
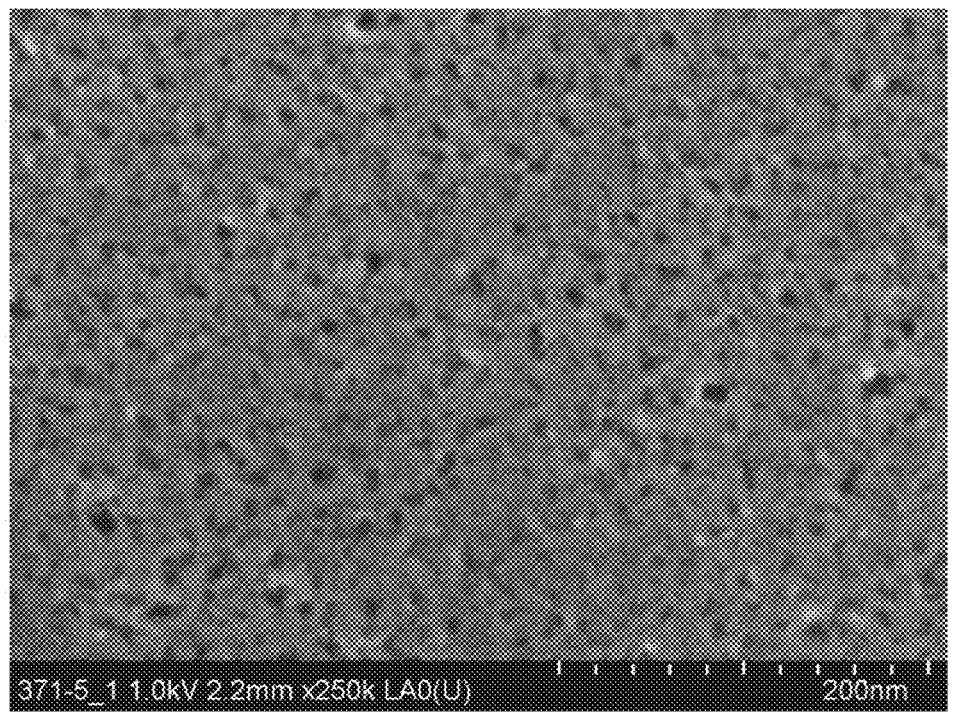
FIG. 15 is a higher magnification SEM image of the microporosity in the activated carbon adsorbent monolith of FIGS. 13 and 14.

FIG. 15 is a higher magnification SEM image of the microporosity in the activated carbon adsorbent monolith of FIGS. 13 and 14.

Figure 16:
FIG. 16 is a photograph of carbon pyrolyzate adsorbent disks prepared from direct compression of blended starch and maltodextrin according to one embodiment.

FIG. 16 is a photograph of carbon pyrolyzate adsorbent disks prepared from direct compression of blended starch and maltodextrin according to one embodiment.

The features and advantages of the carbon pyrolyzate materials of the present disclosure are more fully illustrated by the following non-limiting examples.

EXAMPLE 1

A supply of natural corn starch was obtained and a sample of the starch taken from this supply was weighed and heated to 195° C. in a laboratory air oven to dry and stabilize such precursor material. The dried starch was then pyrolyzed under flowing nitrogen in a tube furnace at 600° C. After cooling, the $N_2$ BET surface area of the corn starch-derived carbon pyrolyzate was determined as 578 $m^2$ per gram, using a Micromeritics ASAP 2420 Porosimeter.

Another sample of the corn starch from the same supply was weighed and compressed into tablet form under pressure of approximately 0.17 mPa (25,000 psi) to obtain preform tablets. The tablets were weighed and measured to enable determination of a piece density for each. The compressed corn starch tablets had an average piece density of 1.20 grams/cc.

These corn starch tablets were then pyrolyzed under flowing nitrogen in a tube furnace at temperature of 600° C. After cooling, the resulting carbon tablets were weighed and measured, and their piece density was calculated. The average piece density of the corn starch-derived carbon tablets was 0.90 grams/cc. The corn starch-derived carbon tablets were analyzed for $N_2$ BET surface area and found to have surface area of 431 $m^2$ per gram. Then the corn starch-derived carbon tablets were reloaded into the tube furnace and heated to 600° C. in flowing nitrogen. Next, the carbon tablets were further heated to 735° C. at which temperature they were exposed to flowing $CO_2$ for a period determined to be adequate for a 20-25% burn-off (oxidative weight loss), and then the carbon tablets were cooled in nitrogen to room temperature. After this physical oxidative activation, the density of the carbon tablets was measured as 0.78 grams/cc. The activated carbon tablets then were measured for $N_2$ BET surface area and found to have surface area of 890 $m^2$ per gram.

EXAMPLE 2

Supplies were obtained of natural sucrose, fructose, dextrose, and lactose. These materials were dried at 90° C. in a lab air oven and then loaded into a tube furnace where they were pyrolyzed under flowing nitrogen purge at temperature of 600° C. After cooling to room temperature, the samples were removed and ground with mortar and pestle to obtain fine powders. The sugar-derived carbon powders were analyzed for $N_2$ BET surface area using a Micromeritics ASAP 2420 Porosimeter. Table 1 shows the results of the surface area measurements.

TABLE 1

Surface Area of Sugar-Derived Carbons

| Carbon Source Material | Measured N2 BET Surface Area - $m^2/g$ |
| --- | --- |
| Fructose | 698 |
| Sucrose | 620 |
| Dextrose | 634 |
| Lactose | 611 |

New samples of lactose were weighed out and tablets were pressed of each material under ~138 MPa (approximately 20,000 psi) of forming pressure. The samples were loaded into tube furnaces for slow pyrolysis under controlled conditions and nitrogen purge. The lactose yielded tablets with a density of 0.88 grams/cc. Table 2 shows the data acquired for the pyrolyzed sugar-derived carbon samples.

TABLE 2

Sugar-Derived Carbon Tablet Data - Tablet Density and Surface Area (SA)

| Carbon Source Material | Tablet Density - grams/cc | Measured N2 BET SA - m$^2$/g |
|---|---|---|
| Lactose | 0.88 | 497 |

The lactose derived carbon tablets were then oxidatively activated in flowing $CO_2$ at 900° C. for a time period selected to achieve approximately 25-30% weight loss (or burn-off). The result was a carbon material that had a piece density of 0.39 grams/cc and a measured surface area of 865 m$^2$ per gram.

EXAMPLE 3

A supply of natural potato starch was obtained. A sample of the starch was weighed and heated in a laboratory air oven to dry and stabilize the sample at temperature of 195° C. The dried starch was then pyrolyzed under flowing nitrogen in a tube furnace at temperature of 600° C. After cooling, the corn starch-derived carbon was analyzed for $N_2$ BET surface area using a Micromeritics ASAP 2420 Porosimeter. A surface area of 498 m$^2$ per gram was determined.

Next, another sample of the same potato starch was weighed out and compressed into tablet form under approximately 103.4 MPa (~15,000 psi) to obtain preform tablets. The tablets were weighed and measured so that a piece density could be calculated. The compressed potato starch tablets had an average piece density of 1.33 grams/cc. A number of the potato starch tablets were pyrolyzed under flowing nitrogen in a tube furnace at temperature of 600° C. After cooling, the resulting carbon tablets were weighed and measured, and the piece density was calculated. The average piece density of the potato starch-derived carbon tablets was 1.29 grams/cc. The potato starch-derived carbon tablets were analyzed for $N_2$ BET surface area and found to have surface area of 459 m$^2$ per gram.

The potato starch-derived carbon tablets were reloaded into the tube furnace and heated to 600° C. in flowing nitrogen, and then further heated to 900° C. while exposed to flowing $CO_2$ for a period of 45 minutes, following which the tablets were cooled in nitrogen to room temperature. After this physical oxidative activation, the density of the carbon tablets was reduced to 0.96 grams/cc. The activated carbon tablets were again measured for $N_2$ BET surface area and surface area was determined to have risen to 910 m$^2$ per gram. Subsequent measurement of methane adsorption on this adsorbent showed a capacity of 108 cc $CH_4$/g at 21° C. and 35 bar pressure which calculates to 104V/V.

EXAMPLE 4

Another sample of the same potato starch discussed in Example 3 was weighed out and compressed into cylindrical tablet form under approximately 223 MPa (~32,346 psi) to obtain preform tablets. The tablets were weighed and measured so that a piece density could be calculated. The compressed potato starch tablets had an average piece density of 1.33 grams/cc. A number of the potato starch tablets were pyrolyzed under flowing nitrogen in a tube furnace at temperature of 600° C. After cooling, the resulting carbon tablets were weighed and measured, and the piece density was calculated. The average piece density of the potato starch-derived carbon tablets was 1.14 grams/cc. The potato starch-derived carbon tablets were analyzed for $N_2$ BET surface area and found to have surface area of 475 m$^2$ per gram.

The potato starch-derived carbon tablets were reloaded into the tube furnace and heated to 600° C. in flowing nitrogen, and then further heated to 775° C. while exposed to flowing $CO_2$ for several hours to a level of 39.9% wt burn-off, following which the tablets were cooled in nitrogen to room temperature. After this physical oxidative activation, the density of the carbon tablets was reduced to 0.86 grams/cc. The activated carbon tablets were again measured for $N_2$ BET surface area and surface area was determined to have risen to 1210 m$^2$ per gram. Subsequent measurement of methane adsorption on this adsorbent showed a capacity of 137.2 cc $CH_4$/g at 21° C. and 35 bar pressure which yielded an absolute $CH_4$ working capacity between 35 bar and 1 bar pressure of 106V/V.

EXAMPLE 5

A supply of natural wheat starch was obtained. A sample of the starch was weighed and heated in a laboratory air oven to dry and stabilize the sample at temperature of 235° C. The dried starch was then pyrolyzed under flowing nitrogen in a tube furnace at temperature of 600° C. After cooling, the wheat starch-derived carbon was analyzed for $N_2$ BET surface area using a Micromeritics ASAP 2420 Porosimeter. A surface area of 543 m$^2$ per gram was determined.

Another sample of the same wheat starch was weighed out and compressed into cylindrical tablet form under approximately 239.4 MPa (~34,724 psi) to obtain preform tablets. The tablets were weighed and measured so that a piece density could be calculated. The compressed wheat starch tablets had an average piece density of 1.32 grams/cc. A number of the wheat starch tablets were pyrolyzed under flowing nitrogen in a tube furnace at temperature of 600° C. After cooling, the resulting carbon tablets were weighed and measured, and the piece density was calculated. The average piece density of the wheat starch-derived carbon tablets was 0.94 grams/cc. The wheat starch-derived carbon tablets were analyzed for $N_2$ BET surface area and found to have surface area of 513 m$^2$ per gram.

The wheat starch-derived carbon tablets were reloaded into the tube furnace and heated to 600° C. in flowing nitrogen, and then further heated to 800° C. while exposed to flowing $CO_2$ for several hours to a level of 29.4% wt burn-off, following which the tablets were cooled in nitrogen to room temperature. After this physical oxidative activation, the density of the carbon tablets was reduced to 0.82 grams/cc. The activated carbon tablets were again measured for $N_2$ BET surface area and surface area was determined to have risen to 1321 m$^2$ per gram. Subsequent measurement of methane adsorption on this adsorbent showed a capacity of 136.5 cc $CH_4$/g at 21° C. and 35 bar pressure which yielded an absolute $CH_4$ working capacity between 35 bar and 1 bar pressure of 107V/V.

EXAMPLE 6

Another sample of the same native corn starch discussed in Example 1 was weighed out and compressed into cylindrical tablet form under approximately 185 MPa (~26,841 psi) to obtain preform tablets. The tablets were weighed and measured so that a piece density could be calculated. The compressed corn starch tablets had an average piece density of 1.32 grams/cc. A number of the corn starch tablets were pyrolyzed under flowing nitrogen in a tube furnace at temperature of 600° C. After cooling, the resulting carbon tablets were weighed and measured, and the piece density was calculated. The average piece density of the corn starch-derived carbon tablets was 0.99 grams/cc. The corn starch-derived carbon tablets were analyzed for $N_2$ BET surface area and found to have surface area of 537 $m^2$ per gram.

The corn starch-derived carbon tablets were reloaded into the tube furnace and heated to 600° C. in flowing nitrogen, and then further heated to 800° C. while exposed to flowing $CO_2$ for several hours to a level of 30.5% wt burn-off, following which the tablets were cooled in nitrogen to room temperature. After this physical oxidative activation, the density of the carbon tablets was reduced to 0.86 grams/cc. The activated carbon tablets were again measured for $N_2$ BET surface area and surface area was determined to have risen to 1251 $m^2$ per gram. Subsequent measurement of methane adsorption on this adsorbent showed a capacity of 134.4 cc $CH_4$/g at 21° C. and 35 bar pressure which yielded an absolute $CH_4$ working capacity between 35 bar and 1 bar pressure of 103V/V.

EXAMPLE 7

A supply of natural cassava starch was obtained. A sample of the starch was weighed and heated in a laboratory air oven to dry and stabilize the sample at temperature of 215° C. The dried starch was then pyrolyzed under flowing nitrogen in a tube furnace at temperature of 600° C. After cooling, the cassava starch-derived carbon was analyzed for $N_2$ BET surface area using a Micromeritics ASAP 2420 Porosimeter. A surface area of 572 $m^2$ per gram was determined.

Another sample of the same cassava starch was weighed out and compressed into cylindrical tablet form under approximately 185 MPa (~26,831 psi) to obtain preform tablets. The tablets were weighed and measured so that a piece density could be calculated. The compressed cassava starch tablets had an average piece density of 1.33 grams/cc. A number of the cassava starch tablets were pyrolyzed under flowing nitrogen in a tube furnace at temperature of 600° C. After cooling, the resulting carbon tablets were weighed and measured, and the piece density was calculated. The average piece density of the cassava starch-derived carbon tablets was 0.95 grams/cc. The cassava starch-derived carbon tablets were analyzed for $N_2$ BET surface area and found to have surface area of 545 $m^2$ per gram.

The cassava starch-derived carbon tablets were reloaded into the tube furnace and heated to 600° C. in flowing nitrogen, and then further heated to 775° C. while exposed to flowing $CO_2$ for several hours to a level of 47.4% wt burn-off, following which the tablets were cooled in nitrogen to room temperature. After this physical oxidative activation, the density of the carbon tablets was reduced to 0.64 grams/cc. The activated carbon tablets were again measured for $N_2$ BET surface area and surface area was determined to have risen to 1323 $m^2$ per gram. Subsequent measurement of methane adsorption on this adsorbent showed a capacity of 122.7 cc $CH_4$/g at 21° C. and 35 bar pressure which yielded an absolute $CH_4$ working capacity between 35 bar and 1 bar pressure of 97V/V.

EXAMPLE 8

A supply of industrial corn starch-derived maltodextrin was obtained. A sample of the maltodextrin was weighed and heated in a laboratory air oven to dry and stabilize the sample at temperature of 235° C. The dried maltodextrin was then pyrolyzed under flowing nitrogen in a tube furnace at temperature of 600° C. After cooling, the corn starch-derived maltodextrin carbon was analyzed for $N_2$ BET surface area using a Micromeritics ASAP 2420 Porosimeter. A surface area of 465 $m^2$ per gram was determined.

Another sample of the same corn starch-derived maltodextrin was weighed out and compressed into cylindrical tablet form under approximately 185.2 MPa (~26,857 psi) to obtain preform tablets. The tablets were weighed and measured so that a piece density could be calculated. The compressed maltodextrin tablets had an average piece density of 1.36 grams/cc. A number of the cassava starch tablets were pyrolyzed under flowing nitrogen in a tube furnace at temperature of 600° C. After cooling, the resulting carbon tablets were weighed and measured, and the piece density was calculated. The average piece density of the corn starch-derived maltodextrin carbon tablets was 1.06 grams/cc. The corn starch-derived maltodextrin carbon tablets were analyzed for $N_2$ BET surface area and found to have surface area of 588 $m^2$ per gram.

The corn starch-derived maltodextrin carbon tablets were reloaded into the tube furnace and heated to 600° C. in flowing nitrogen, and then further heated to 950° C. while exposed to flowing $CO_2$ for just 3 hours to a level of 49.9% wt burn-off, following which the tablets were cooled in nitrogen to room temperature. After this physical oxidative activation, the density of the carbon tablets was reduced to 0.76 grams/cc. The activated carbon tablets were again measured for $N_2$ BET surface area and surface area was determined to have risen to 1581 $m^2$ per gram. Subsequent measurement of methane adsorption on this adsorbent showed a capacity of 152.5 cc $CH_4$/g at 21° C. and 35 bar pressure which yielded an absolute $CH_4$ working capacity between 35 bar and 1 bar pressure of 121V/V.

EXAMPLE 9

Cylindrical tablets combining varied ratios of the native corn starch discussed in Examples 1 and 6 mixed with the corn starch-derived maltodextrin discussed in Example 8 were formed under a range of compressive conditions between 28 and 338 MPa (~4050 psi to 49,000 psi) to obtain preform tablets. The tablets were weighed and measured and evaluated in several ways for strength and other important physical properties. The blended materials followed a very linear rule of mixtures relationship to the properties obtained with either the pure corn starch or the pure maltodextrin.

Upon pyrolysis to 600° C. this adherence to the rule of mixtures was maintained. Thus it was determined that blending of maltodextrin and corn starch, or likely any of the natural starches, at the optimal ratios could take advantage of the beneficial qualities of each of these materials.

Table 3 below summarizes the properties of several of the embodiments described herein.

TABLE 3

Measured Properties of Active Carbon Monolith Tablets Prepared from Carbohydrates

| Sample # | Source Material | As Pyrolyzed $N_2$ BET S.A. - $m^2$/cc | $CO_2$ Activation Conditions | Burn-Off - % wt | Density - g/cc | $N_2$ BET S.A. - $m^2$/g | $N_2$ BET S.A. - $m^2$/cc | D-R MPV - cc/g | Total CH4 Adsorption Capacity - $cm^3$/cc | Absolute CH4 Working Capacity - $cm^3$/cc 35 bar-1 bar |
|---|---|---|---|---|---|---|---|---|---|---|
| N0190-25-50A | Potato Starch | 455 | 8 hrs @ 775 C. | 25.9 | 0.96 | 910 | 874 | 0.3616 | 104 | 81 |
| N0190-37-PS | Potato Starch | 475 | 30 hrs @ 775 C. | 39.9 | 0.86 | 1210 | 1045 | 0.4831 | 137.2 | 106 |
| N0190-72-WT | Wheat Starch | 513 | 16 hrs @ 800 C. | 29.4 | 0.82 | 1321 | 1083 | 0.5771 | 136.5 | 107 |
| N0190-71-PB | Native Corn Starch | 537 | 14 hrs @ 775 C. + 8 hrs @ 800 C. | 30.5 | 0.86 | 1251 | 1076 | 0.5044 | 134.4 | 103 |
| N0190-57-CC | Cassava Starch | 545 | 13 hrs @ 775 C. | 47.4 | 0.64 | 1323 | 845 | 0.5289 | 122.7 | 97 |
| N0190-82-MD | 10DE Maltodextrin | 588 | 3 hrs @ 950 C. | 49.9 | 0.76 | 1581 | 1195 | 0.6373 | 152.5 | 121 |

EXAMPLE 10

Several samples of the starch-derived carbons were selected for testing of boron trifluoride adsorption capacity, as this large flat molecule provides good assessment of slit-shaped porosity in microporous carbons. All the starch-derived carbon samples had been pyrolyzed under flowing nitrogen in a tube furnace at a temperature of 600° C. Each was then oxidatively activated in $CO_2$ at temperatures between 600° C. and 1000° C. to boost surface area to greater than 1000 square meters per gram.

The starch-derived carbon tablets were each analyzed for level of burn-off, tablet density, and $N_2$ BET surface area. Then the tablets were tested for boron trifluoride adsorption capacity and deliverables at 21° C. in vacuum swing operation simulating conditions that an implant dopant gas application would employ. Results were compared to a representative sample of PVDC-derived carbon adsorbent.

Table 4 shows the results of this work. It can be seen that high surface area carbon adsorbents derived from a variety of starches and maltodextrin can achieve similar gravimetric adsorption capacity for $BF_3$ as that demonstrated by the PVDC carbon. The ability to deliver much of that adsorbed $BF_3$ to a vacuum process, such as an ion implanter, was also demonstrated by adsorbing gas up to equilibration at approximately 725 Torr and desorbing back down to 20 Torr at isothermal conditions of 21° C. to determine working capacity.

TABLE 4

Boron Trifluoride Capacity Data for Selected Carbohydrate Derived Carbon Adsorbents

| Carbon Sample No. | Source Material | Pyrolysis Temp. (C.) | $CO_2$ Activation Temp. (C.) | Denisty (g/cc) | Burn-Off (% wt) | $N_2$ BET S.A. (sq. m/g) | $N_2$ BET S.A. (sq. m/cc) | 21 C. $BF_3$ Ads. Capacity (wt %) | $BF_3$ wt % Working Capacity @21 C. |
|---|---|---|---|---|---|---|---|---|---|
| N0190-23-PT2 | Potato Starch | 600 | 900 | 0.69 | 47.8 | 1571 | 1084 | 28.2 | 16.5 |
| N0190-57-CC58 | Cassava Starch | 600 | 775 | 0.64 | 47.4 | 1327 | 849 | 34.6 | 15.3 |
| N0190-71-PB17 | Corn Starch | 600 | 800 | 0.86 | 30.5 | 1270 | 1092 | 28.4 | 15.1 |
| N0190-72-WT15 | Wheat Starch | 600 | 800 | 0.82 | 29.4 | 1437 | 1178 | 37.5 | 15.0 |
| N0190-77-AB25 | 10DE Maltodextrin | 600 | 775 | 0.93 | 37.8 | 1169 | 1087 | 20.4 | 11.3 |
| HF02-34 | PVDC | | | 1.12 | | 1030 | 1154 | 23.3 | 11.9 |

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure correspondingly contemplates such features, aspects and embodiments, or a selected one or ones thereof, in various permutations and combinations, as being within the scope of the present disclosure.

Accordingly, while the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A carbon pyrolyzate characterized by:
   derivation from naturally-occurring carbohydrate source material;
   <1% total ash content, as determined by the procedure of ASTM D2866-11;
   piece density in a range of from 0.50 g/cc to 1.40 g/cc;
   $N_2$ BET surface area greater than 750 m2/gm;
   having from 40% to 90% of its pore volume in micropores having a size in a range of 0.3 nm to less than 2.0 nm; and
   methane adsorption capacity, at 21° C. and 35 bar pressure, of greater than 100V/V.

2. The carbon pyrolyzate of claim 1, in a particulate form.

3. The carbon pyrolyzate of claim 1, in a monolithic form.

4. The carbon pyrolyzate of claim 1, as a gas storage medium in a gas supply package.

5. The carbon pyrolyzate adsorbent of claim 1, wherein the naturally-occurring carbohydrate source material comprises disaccharide or polysaccharide.

6. The carbon pyrolyzate adsorbent of claim 1, wherein the naturally-occurring carbohydrate source material comprises material selected from the group consisting of lactose, starches, natural gums, chitin, chitosan, amylose, amylopectin, dextrins, maltodextrin, and mixtures of the foregoing.

7. The carbon pyrolyzate adsorbent of claim 1, in an activated form.

8. The carbon pyrolyzate adsorbent of claim 7, wherein the activated form has been activated by chemical and/or physical activation.

9. The carbon pyrolyzate adsorbent of claim 1, having less than 0.5% total ash content, as determined by the procedure of ASTM D2866-11.

10. The carbon pyrolyzate adsorbent of claim 1, wherein the adsorbent is binderless.

11. A gas supply package, comprising a gas supply vessel holding an adsorbent according to claim 1.

* * * * *